United States Patent [19]

Nishihama et al.

[11] Patent Number: 4,488,803
[45] Date of Patent: Dec. 18, 1984

[54] SLIT EXPOSURE TYPE COPYING CAMERA

[75] Inventors: Takamichi Nishihama; Masahiko Otsuji, both of Hikone, Japan

[73] Assignee: Dainippon Screen Manifacturing Co., Ltd., Kyoto, Japan

[21] Appl. No.: 463,184

[22] Filed: Feb. 2, 1983

[30] Foreign Application Priority Data

May 12, 1982 [JP] Japan .................... 57-69012[U]

[51] Int. Cl.³ .................................. G03B 29/00
[52] U.S. Cl. ............................ 355/28; 355/51; 355/73
[58] Field of Search ................ 355/28, 29, 51, 43, 355/65, 14 SH, 50, 73, 91; 83/100, 435.1

[56] References Cited

U.S. PATENT DOCUMENTS 3,425,777 10/1966 White .............................. 355/28
3,535,038 6/1968 Stievenart et al. ............... 355/28
3,684,280 8/1972 Samuels et al. ............ 355/14 SH X
3,875,861 4/1975 Stackig ...................... 355/28 X Primary Examiner—L. T. Hix
Assistant Examiner—Brian W. Brown
Attorney, Agent, or Firm—Millen & White

[57] ABSTRACT

A slit exposure type copying camera comprises an original-mounting glass sheet (4) placed on the upper surface of a camera box (1), a suction member (10) adapted to transfer a rolled photosensitive material (2) in the lower region of the interior of said box, a slit exposure type scanner (5) adapted for being reciprocated in a region between said glass sheet and said photosensitive material, a cutter (6) disposed adjacent an exposure start position to cut the photosensitive material exposed to light by means of said scanner, and conveying means (19, 7) for conveying the exposed cut strip outside the camera.

6 Claims, 1 Drawing Figure

U.S. Patent    Dec. 18, 1984    4,488,803
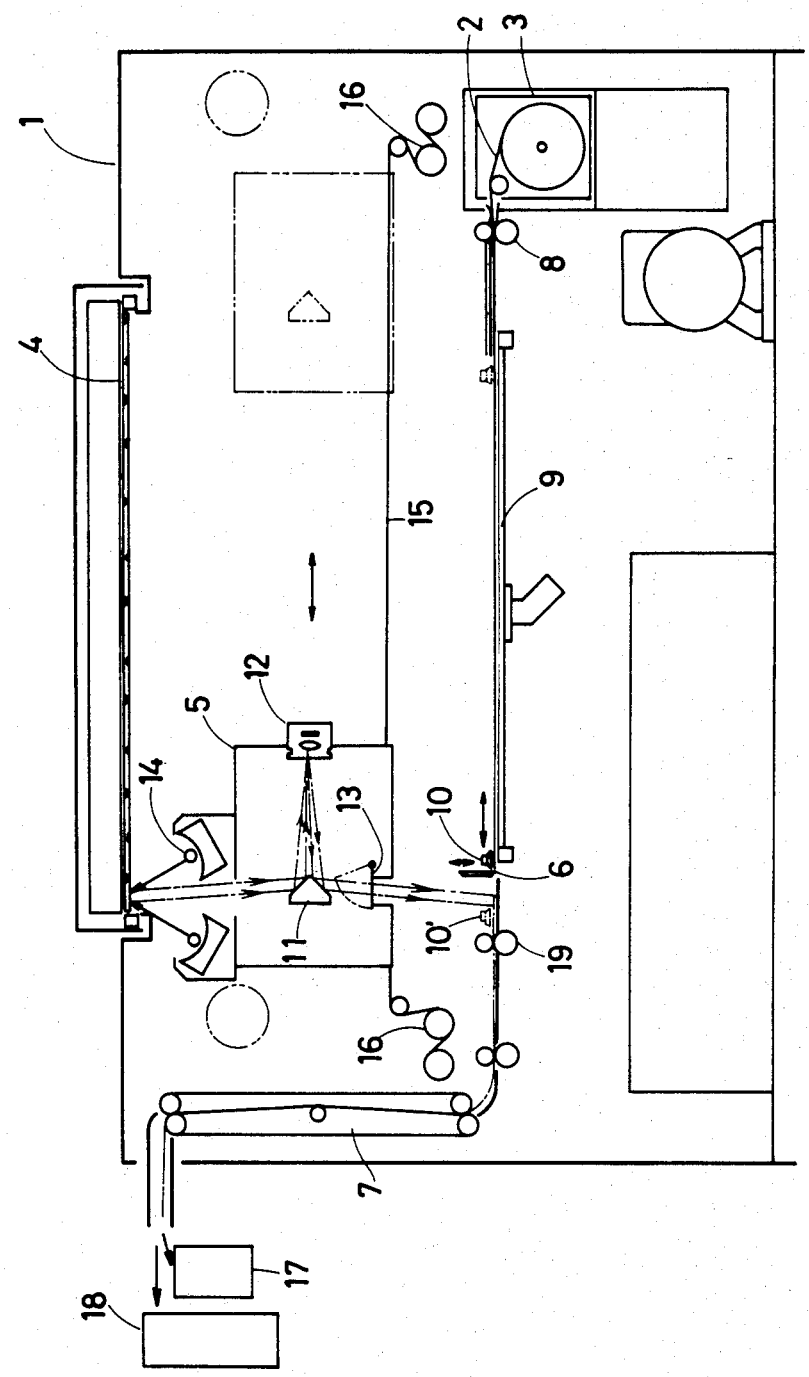

SLIT EXPOSURE TYPE COPYING CAMERA

BACKGROUND OF THE INVENTION

The present invention relates to a slit exposure device in a copying camera.

Generally, copying cameras are used in various fields and include a process camera, which is a device used in a photomechanical process, to effect direct exposure of a sensitized printing plate to light from a given original, or to expose to light a film used in the course of photomechanical process. Such process cameras are classified according to construction into the horizontal low bed type, the horizontal suspension type, the vertical type (table type), and the vertical enlarger, etc. There is a special one which is of box-looking construction. According to the type of exposure, they are classified into two types, one in which the entire surface is simultaneously exposed to light from an original, and the other in which slit exposure is effected.

The process camera of box-looking construction is characterized by protection against the influence of outside light and against leakage of exposure light to the outside of the camera during exposure, and by compactness in construction thereby not occupying much space. The exposure system of the camera of box-looking construction is conventionally the entire surface simultaneously exposure system, but, as can be seen in the applicant's prior application (Japanese Utility Model Application Disclosure No. 23535/1982), some copying cameras of this type have employed the slit exposure system. The slit exposure system using said box-looking construction has a merit that while making effective use of the features of the box-looking construction it is possible to shorten the distance between the original and the exposure surface, which is a feature of the slit exposure system, thus reducing the size of the entire device.

However, since the conventional camera of box-looking construction using the slit exposure system contains developing and drying devices in the box, it is only possible to use such a photosensitive material as is particularly suited for the camera, and for a user who has already installed an individual developing device, etc., which can be used for various types of photosensitive materials, this camera is rather inconvenient, and lacks versatility. Further, since treating solutions such as a developing solution are used, it is essential to use an expensive rust-proof material for the construction of the device.

SUMMARY OF THE INVENTION

Accordingly, the present invention has been devised in light of the drawbacks of the conventional type devices and is intended to provide a process camera using the box-looking slit exposure system wherein the transfer of a rolled photosensitive material is effected by suction member and after exposure the photosensitive material is cut and the exposed strip is conveyed out of the device, thereby reducing the size of the device and shortening one cycle of exposure operation.

BRIEF DESCRIPTION OF THE DRAWING

The FIGURE is a diagrammatic cross-section side view of the device of the invention.

DETAILED DISCUSSION OF THE INVENTION

The arrangement of the device of the present invention will now be described with reference to one embodiment thereof shown in the accompanying drawing. The drawing is a side view of an equimultiplication (1x) process camera of box-looking construction using the slit exposure system, and an outline of the elements thereof will first be described and identified. The numeral 1 denotes a box housing, and a magazine 3 storing a rolled photosensitive material 2 is installed in the lower region of said box housing 1 on one side thereof, with said photosensitive material 2 being horizontally played out from said magazine. Installed on the upper surface of the box 1 is a glass sheet 4 for mounting an original thereon. A slit exposure type scanner 5 horizontally moves back and forth in a region between the photosensitive material 2 placed on a vacuum suction plate 9 and the glass sheet 4, whereby the image of the original placed on the glass sheet 4 is projected on the photosensitive material as the latter is exposed to light from the original. On the side opposite to said magazine 3, i.e., at the exposure start position, there is installed a cutter 6 for cutting the rear end of the exposed portion of the photosensitive material delivered by a pair of nip rollers 19 upon completion of the exposure. The exposed cut strip of the photosensitive material 2 is held between transfer belts 7 and thereby conveyed out of the machine.

As for the transfer of the photosensitive material 2 in the initial stage of operation, it comprises the steps of placing in the box housing 1 the magazine 3 storing the photosensitive material 2 therein, withdrawing the photosensitive material 2 from the magazine 3 to some extent, and engaging it with the first nip roller pair 8 which then delivers it to the right-hand end of the vacuum suction plate 9. Then, a suction member 10 having its original position 10' located adjacent the second nip roller pair 19 moves to the right-hand side of the vacuum suction plate 9, sucks the front upper surface of the photosensitive material 2 and transfers it to the cutter 6, where the suction member 10 releases the photosensitives material 2, thus placing the latter over the entire surface of the vacuum suction plate 9. The suction member 10 returns to the original position 10', whereupon vacuum suction for the vacuum suction plate 9 is started so as to fix the photosensitive material 2 in the flat state. When exposure by the scanner 5 is completed, the suction member 10 is moved again to the cutter 6 to suck the front end of the exposed photosensitive material 2 and then back to the original position 10' adjacent to the second nip roller pair 19 so as to engage it with the latter. When the second nip roller pair 19 is driven for a predetermined time, the exposed portion of the photosensitive material 2 all passes under the cutter. After the predetermined length has passed, the nip roller pair 19 is once stopped, and the photosensitive material 2 is cut by the cutter 6. The cut exposed portion of the photosensitive material 2 is conveyed outside the machine through the second nip roller pair 19 and transfer belts 7. Since the photosensitive material 2 is transferred by the suction member 10, even if it is flexible and tends to curl itself as a result of being previously rolled, it can be smoothly transferred. Further, since the photosensitive material 2 is conveyed directly over the vacuum suction plate 9, unlike the case of transfer and flat retention being effected by the use of a conventional porous belt, the photosensitive material 2 can be maintained flat to the very end thereof and accurate exposure is possible without any loss of material.

As for the scanner 5, it is constructed in box form, containing a reflecting mirror 11, an in-mirro lens 12, and a shutter 13 adapted to be opened and closed by a rotary solenoid, with elongated light source lamps 14 mounted on the upper surface of said scanner 5. The scanner 5 is moved back and forth in a suitable manner such as by a rope or line. As the scanner 5 is moved back and forth, a blackout curtain 15 is wound and unwound by a constant torque winding spring-containing cylinder 16. The range of travel of the scanner 5 is such that the scanner starts at the left-hand side of the cutter 6 and after an approach run it begins exposure starting at the right-hand side of the cutter 6 until it is a little beyond a predetermined exposure length or beyond the vacuum suction plate 9, whereupon it stops. In addition, accurate control of the exposure length on the photosensitive material 2 is effected by the opening and closing of the shutter 13.

Further, a box 17 for receiving the photosensitive material 2 and a developing device 18 are installed adjacent said copying camera. Installed between the copying camera and the receiving box 17 is an unillustrated switching device whereby the exposed strip of the photosensitive material 2 is switched either to the receiving box 17 or to the developing device 18. Thus, since there is no developing device installed inside the camera, the user may select and use any desired developing device.

The device of the present invention has the following advantages.

(1) The original can be placed on the upper surface of the camera box and the camera can be operated in a common illuminated room. Since the transfer of the photosensitive material is effected in the lower region of the box by the suction member, the space providing the path of light for exposure can be utilized as the space for the movement of the suction member, there being no need to provide such a space separately. The height of the box can be decreased and the loading and unloading of originals is easy. Thus, as a whole, the operability of the process camera is improved.

(2) Although the slit exposure is inferior to the entire surface exposure in that the operating speed is lower by an amount corresponding to the time required for the movement of the scanner, the cutting of the photosensitive material after exposure enables the setting of the photosensitive material before exposure and the delivery of the exposed photosensitive material to be simultaneously effected, thus reducing time and making up for the inferiority in speed. Merits of the slit exposure make the device compact, contributing to the improvement of operability described in (1).

(3) Since the transfer of the photosensitive material is effected by the suction member, the photosensitive material can be used to the very end thereof, producing no loss of material.

What is claimed is:

1. In a slit exposure type copying camera comprising a glass sheet for mounting an original thereon, said glass sheet located on the upper surface of a camera box housing, a suction generating surface adapted for holding a predetermined length of unrolled photosensitive material by suction in a plane parallel to said original mounting glass sheet in the lower region of the interior of said camera box, a slit exposure type scanner adapted for being reciprocably moved in a region between said glass sheet and said suction generating surface, transfer means for transferring said predetermined length of photosensitive material onto and from said suction generating surface, cutter means disposed adjacent an exposure start position for cutting said predetermined length of photosensitive material exposed to light by means of said scanner, and conveying means for conveying the exposed cut length outside of the camera, the improvement wherein: said suction generating surface is a stationary suction plate capable only of selectively holding photosensitive material transferred thereon; and said transfer means for transferring said predetermined length of photosensitive material to and from said stationary suction plate comprising drive means positioned between said cutter means and said conveying means, said drive means being adapted for advancing a length of photosensitive material to said conveying means after exposure thereof, and for simultaneously pulling another length to be exposed onto said stationary suction plate from its unwinding station wherein it is stored in rolled form; and a movable suction member adapted for lifting the cut end of said length from said suction plate and transferring it into engagement with said drive means.

2. A slit exposure type camera as in claim 1, wherein said suction member is also adapted for transferring a first of said predetermined length of photosensitive material which is loaded in said unwinding station in rolled form from said unwinding station onto said stationary suction plate into position for exposure thereof.

3. A slit exposure type camera as in claim 1, wherein said drive means comprises nip rollers.

4. A slit exposure type camera as in claim 1, further comprising developing means arranged outside said box housing for receiving and developing photosensitive material exposed in said box housing.

5. A slit exposure type camera as in claim 4 further comprising a receiving box arranged outside said box housing, and selective switching means for selectively transferring exposed photosensitive material to one of said developing means or said receiving box.

6. A slit exposure type camera as in claim 1, wherein said scanner comprises elongate light source lamps for illuminating an original from which a copy is to be made.

* * * * *